Figure 1:
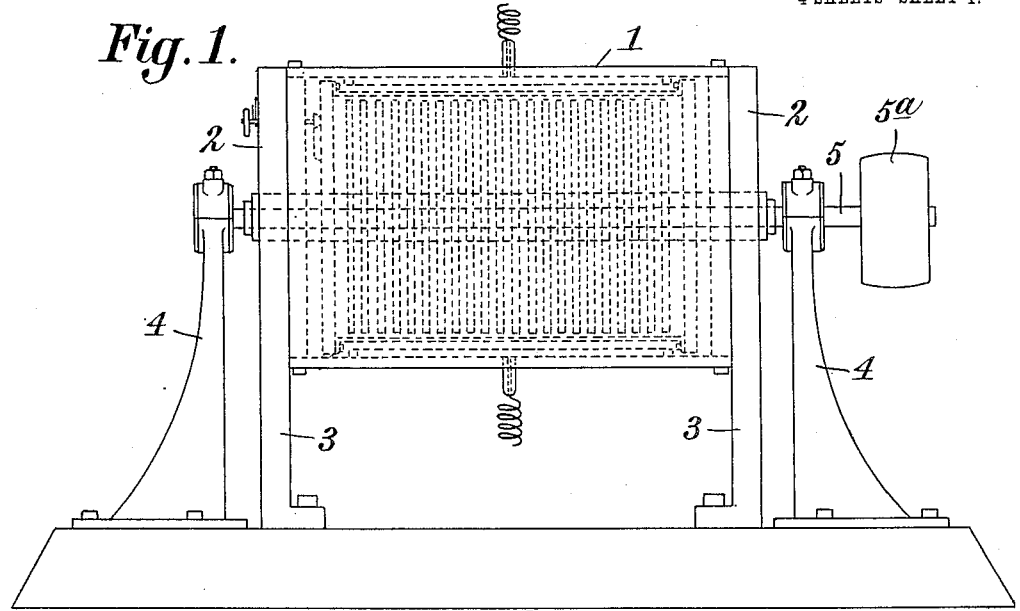

N. MYSCHKIN.
ELECTRIC MOTOR FOR HIGH TENSION CURRENTS.
APPLICATION FILED OCT. 30, 1908.

913,541.
Patented Feb. 23, 1909.
4 SHEETS—SHEET 1.

WITNESSES:
Fannie Fish
H. P. Suhrbier

INVENTOR
Nikolaus Myschkin
BY
ATTORNEYS.

N. MYSCHKIN.
ELECTRIC MOTOR FOR HIGH TENSION CURRENTS.
APPLICATION FILED OCT. 30, 1908.

913,541.

Patented Feb. 23, 1909.
4 SHEETS—SHEET 2.

WITNESSES:
Fannie Fisk

INVENTOR
Nikolaus Myschkin
BY
ATTORNEYS.

N. MYSCHKIN.
ELECTRIC MOTOR FOR HIGH TENSION CURRENTS.
APPLICATION FILED OCT. 30, 1908.

913,541.

Patented Feb. 23, 1909.

WITNESSES:

INVENTOR

ATTORNEYS.

N. MYSCHKIN.
ELECTRIC MOTOR FOR HIGH TENSION CURRENTS.
APPLICATION FILED OCT. 30, 1908.

913,541.

Patented Feb. 23, 1909.
4 SHEETS—SHEET 4.

WITNESSES:

INVENTOR
Nikolaus Myschkin
BY
ATTORNEYS.

UNITED STATES PATENT OFFICE.

NIKOLAUS MYSCHKIN, OF NEW ALEXANDRIA, RUSSIA.

ELECTRIC MOTOR FOR HIGH-TENSION CURRENTS.

No. 913,541.  Specification of Letters Patent.  Patented Feb. 23, 1909.

Application filed October 30, 1908. Serial No. 460,226.

*To all whom it may concern:*

Be it known that I, NIKOLAUS MYSCHKIN a subject of the Czar of Russia, residing in New Alexandria, in the Province of Lublin, in the Empire of Russia, have invented certain new and useful Improvements in Electric Motors for High-Tension Currents, of which the following is a specification.

In electric motors as hitherto in use a current conductor is moved or actuated in a magnetic field. The efficiency or output of such a motor depends upon the intensity of the magnetic field and the strength of current in the revolving armature. If the strength of current increases then the intensity of the magnetic field also increases, so that consequently with currents of greater strength a greater amount of mechanical work may be performed even at lower voltage.

In contradistinction to these electric motors, known as magneto electric motors, this invention relates to a motor without a magnetic field, which for the purpose of this specification I will call an electro static motor, the motor being worked with high tension currents. The inventor has found that a dielectric disk can be made to revolve if it is exposed to the action of moving air-ions such as are developed in the proximity of the electrodes of Röntgen tubes and in the proximity of the conductors of electrical machines. Even a thin straight wire charged with a high tension current is suitable for exerting an influence of the type above described on dielectric disks. The reason for this influence or action is to be found in the fact that the ions are set into motion in the ionized air at a velocity which is proportional to the difference of potential. The ions projected onto the surface of the dielectric disk thereby disturb the uniformity of motion of the ions, thus producing forces of internal friction which set the disk into motion.

Although it may not appear to be possible to effect, without further ado, the discharge of these high tension currents from spherical surfaces under certain premises, nevertheless it has been found that the best effect or result as regards revolution is obtained if the ionization of air is effected by means of points arranged tangentially—or approximately so—to the periphery of the dielectric disks. The use of such needle point dischargers results simultaneously in the advantage that an easy regulation of the current density acting on the dielectric disks can be obtained. The practical construction of such a motor causes, it is true, considerable difficulties, inasmuch as the arrangement of the dielectric disks on the one hand and that of the needle point dischargers on the other hand require considerable space, so that the motor would be very heavy and clumsy. This difficulty is overcome according to this invention by exposing each dielectric disk to the action or influence of a great number of needle points which are in a certain relation to the numerous dielectric disks arranged on a common spindle or shaft. Adjustable screens or plates adapted to be placed between the dielectric disks and the points regulate the action or effect of the latter.

Two modes of carrying out the invention are illustrated in the accompanying drawings.

Figure 2:
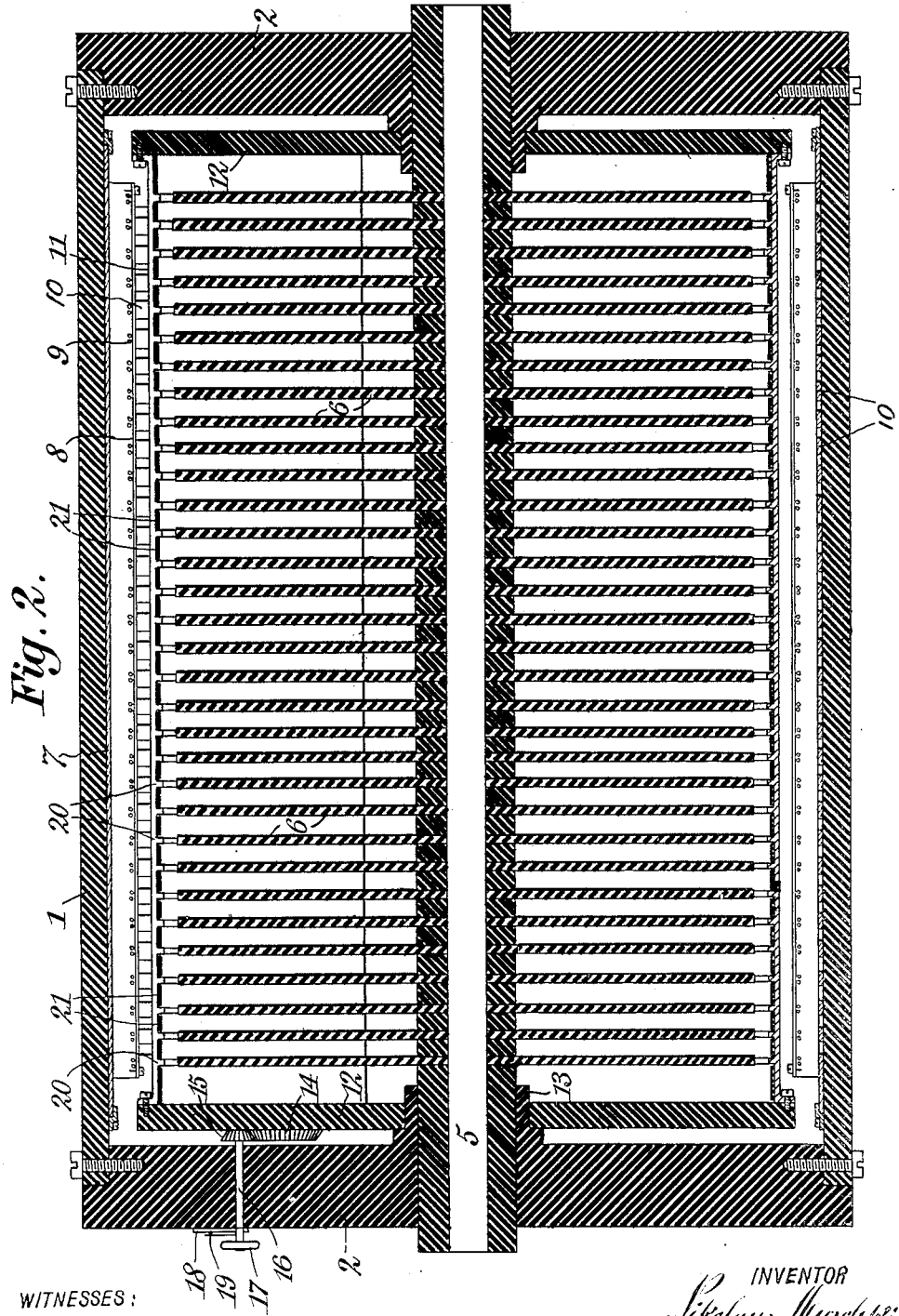

Figure 1 is a side elevation of the electric motor for high tension currents. Fig. 2 is a longitudinal section through the electric motor on line 2—2 of Fig. 3 and, Fig. 3 a cross section through the same, while Figs. 4 and 5 are sections showing modifications of the invention.

The stationary casing consisting entirely of insulating material comprises a cylinder, 1, and two end covers, 2, which are carried by feet, 3. The shaft or spindle, 5, concentric to the cylinder, 1, is, mounted in standards, 4. The shaft 5 carries a considerable number of dielectric disks 6 of insulating material and preferably secured to the shaft 5 by means of suitable insulating means. The shaft 5 is provided in the usual manner with a belt pulley $5^a$ or with any other suitable device. The cylinder 1 may be conveniently made in halves connected together in any suitable manner for instance by flanges and screws.

A curved plate 7 is secured to the interior of each semi-cylinder and carries needle points 9 on ribs or plates 8, the points being arranged like the teeth of a comb. The points are situated tangentially to the dielectric disks 6 or approximately so. The plates 7 of the needle point dischargers, are connected with curved metal plates or wires 10 arranged on the interior of each semi-cylinder, 1. Finally metal plates 11 are arranged on the insulating disks 12. The insulating disks 12 rest on bosses 13, on the end covers 2 of the motor casing. One of the insulating disks 12 is provided with a toothed pinion 14 which engages a pinion 15, the latter being mounted on a spindle 16 passing through one end cover 2. The shaft 16 can be adjusted from the outside by means of a hand-wheel 17, the adjustment being indicated by a pointer 19 on the shaft movable over a scale 18 on the end or head 2. As may be seen especially from Fig. 3, the plates 11 are situated between the dielectric disks 6 and the plates 10 or the needle point dischargers 9. On rotation of the hand wheel 17 in accordance with the scale 18 the position of the plates 11 relatively to the plates 10 or to the needle point dischargers 9 may be varied in such a manner that more or less of the dischargers come into action. The plates 11 therefore form regulators for the output or power of the motor. They are provided on their inside with radially arranged ribs 20 (Fig. 2) between which plates 21 of insulating material are arranged. With this form of construction as may be seen from Fig. 1 a motor of compact build is obtained which possesses a comparatively great output or efficiency. It may be remarked that the dielectric disks are preferably round, and the arrangement of the needle point dischargers may be altered without departing in any way from the scope of this invention. The plates or wires 10 tend to increase the electric stress at the periphery of the disks and to increase the turning effort. Preferably the number of plates or wires 10 is equal to that of the disks 6. The length of the metal segments 10 which is approximately or exactly equal to the breadth of the regulating plates 11 depends on the one hand upon the diameter of the disks and on the other hand upon the impressed voltage. As regards the regulator 11 it is to be noted that the radial ribs 20 have the same effect as the segments 10, for this reason it may appear necessary in certain cases where such regulator 11 is used to omit the segments 10 altogether as the above described effect or action may be produced by the radial ribs or in-set pieces 20 of the regulator 11 consequently just as many radial ribs 20 are provided as there are disks 6 on the shaft 5.

Although the motor as such possesses in the form of construction just described a compact design or shape, nevertheless a large amount of space and weight will be necessary for motors of greater power or efficiency. It is desirable therefore to complete or perfect the needle point dischargers or to alter their arrangement relatively to the dielectric disks in such a manner that their efficiency is increased. This is done according to the modification of the invention shown in Fig. 4, by arranging tongues 22 on the insulating strips 21 of the regulator 11, the tongues 22 being placed between the dielectric disks 6 and carrying on one side plates 23 are also provided with needle point dischargers 24. Practical experiments have proved that it is advisable not to arrange the plates 23 in radial direction but in a certain curvature so that the axis of each needle point discharger has a certain inclination to the surface of the disk. Plates 23 having two rows of needle points 24 are preferably secured on each tongue 22 and slightly inclined to the next disk. It is obvious that the action of the regulator 11 can only extend to the needle point dischargers 9 influence upon the points 24 being of course out of the question.

Figure 3:
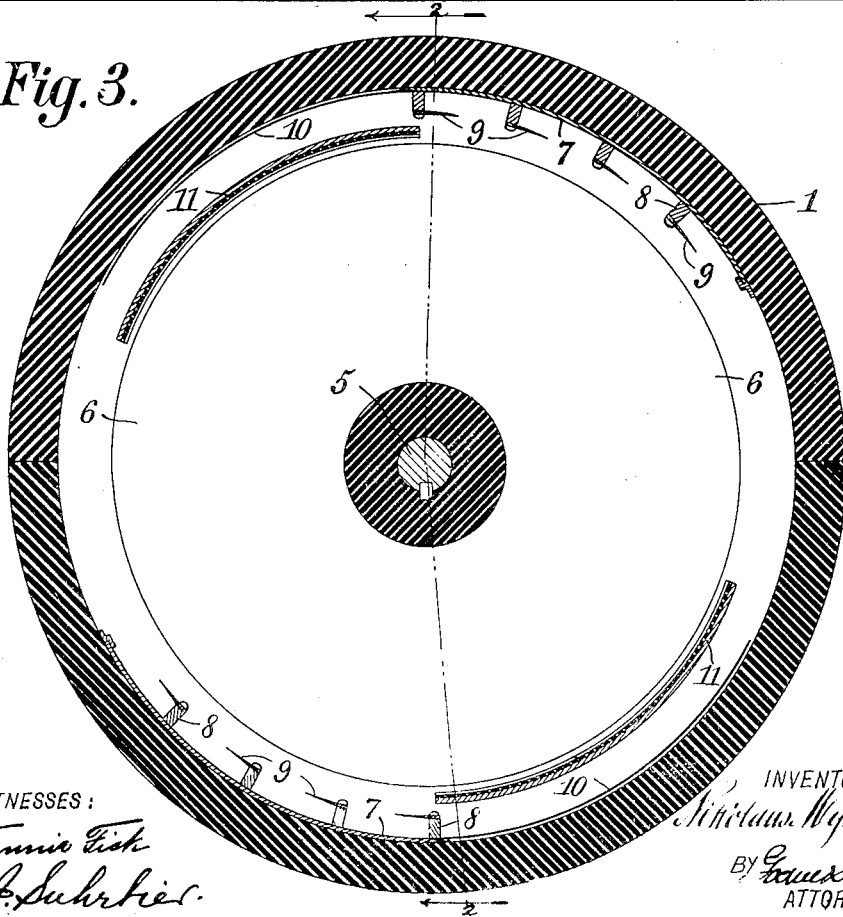
Figure 4:
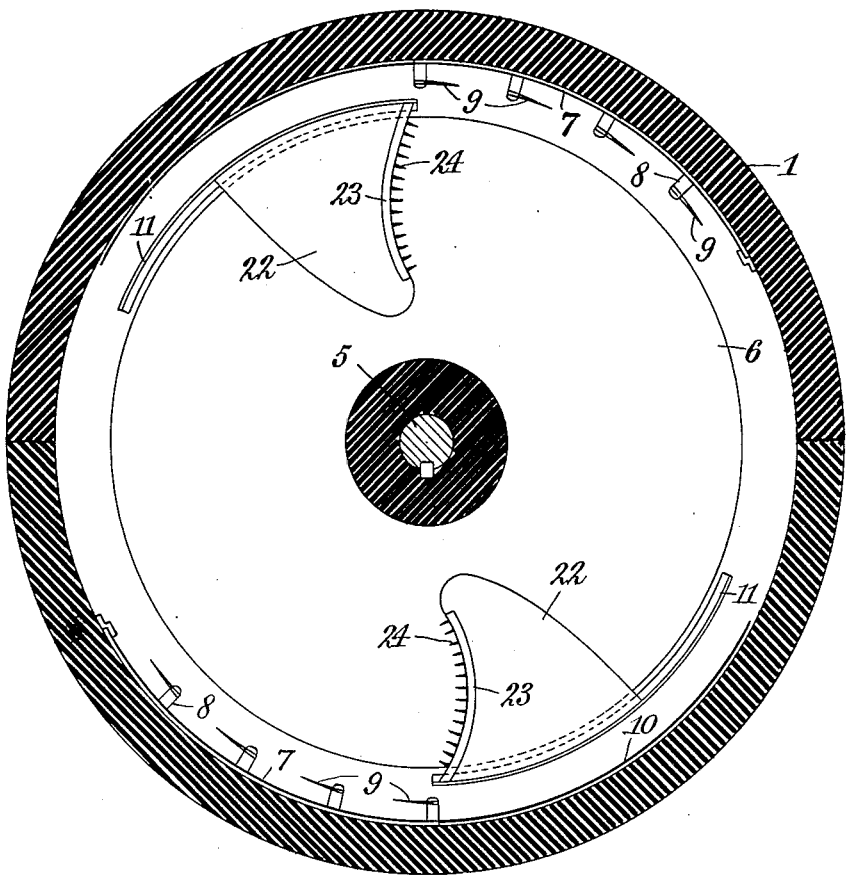
Figure 5:
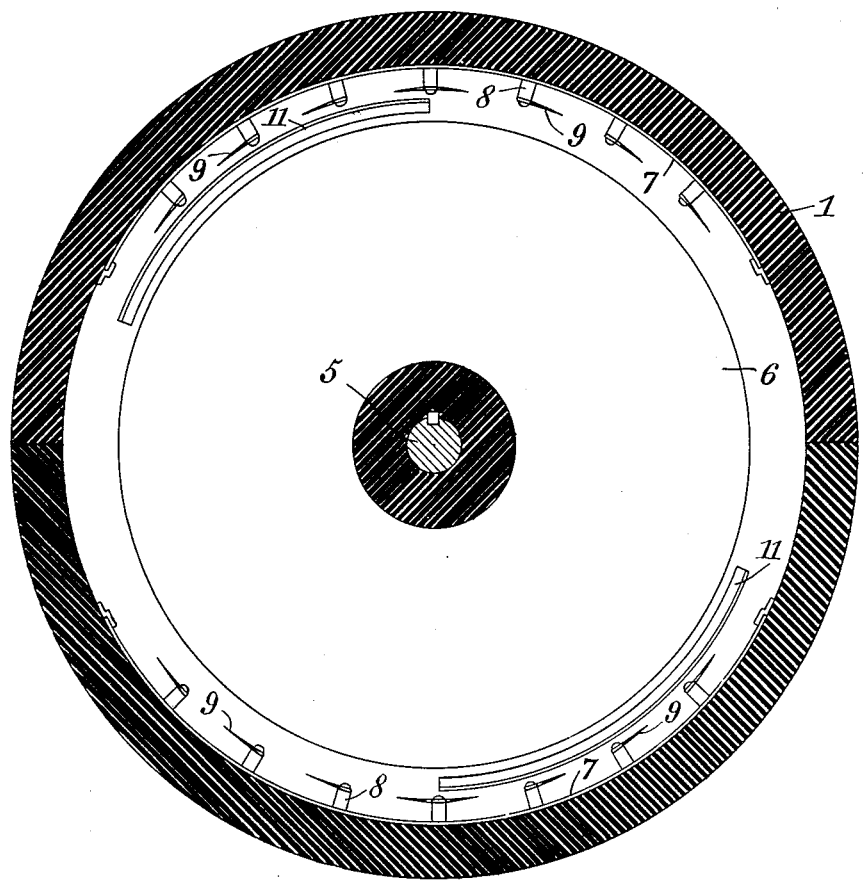

In the motor herein described the direction of revolution depends upon the position of the needle point dischargers 9 or 23 that is to say the revolution follows the direction of the needle point dischargers, consequently in the examples shown in Figs. 3 and 4 the revolution occurs in a clockwise direction. This fact and the possibility of regulating the motor by means of the regulator plates 11 reveal the way and means of effecting a reversal of the motor without cutting out or changing the driving current. Such a mode of reversing is illustrated by Fig. 5 and it consists in disposing the needle point dischargers 9 so that some point in the one direction and some in the opposite direction, in which case one or other group of dischargers is made ineffective by interposing the respective regulator plate 11 between the corresponding group of the needle point dischargers and the dielectric disks. In the position of the regulator plates shown in Fig. 5 a revolution in a clockwise direction is to be expected but by a suitable adjustment of the regulator plates a revolution occurs in the reverse direction.

As already mentioned at the outset, this motor is designed for high tension currents, $i.\ e.$ from a few thousand volts to many hundred thousand volts. Such a motor affords a great advantage over ordinary low tension motors. With such light tension currents the transmission of energy over great distances by means of mains or leads offers little difficulty as compared with the considerable losses of energy which occur when transmitting low tension currents. High tension currents have, as is well known, the advantage of requiring only one conducting wire or lead as the ground or earth may serve as a return conductor for the current. Further it may be mentioned that the electric motor described herein also permits of the utilization of atmospheric electricity collected by means of an electric collector extending up into the atmosphere and provided with a conductor. By this means, especially if thunder or storm clouds exist, an electric current is produced as long as there is a difference in potential between the collector and the cloud.

Having thus described my invention I claim as new and desire to secure by Letters Patent:

1. In an electric motor, the combination with a dielectric disk and a plurality of dischargers co-acting therewith, of a regulating plate arranged to be interposed between the disk and the dischargers.

2. In an electric motor, the combination of a rotary dielectric disk, a series of fixed dischargers arranged at the periphery thereof, and a shiftable regulating plate arranged to be interposed between any or all of the dischargers and the disk.

3. In an electric motor, the combination of a casing, a plurality of dielectric disks rotatable side by side in said casing, a plurality of series of dischargers on the casing-wall adjacent the disks at the peripheries of the latter, and a shiftable regulating plate arranged to be interposed between all the disks and their dischargers.

4. In an electric motor, the combination of a casing, a plurality of dielectric disks rotatable side by side in said casing, a plurality of series of dischargers on the casing-wall adjacent the disks at the peripheries of the latter, a regulating plate shiftable into the space between the disks and dischargers, and means to operate said plate from the exterior of the casing.

5. In an electric motor, the combination with a dielectric disk, and dischargers arranged in oppositely directed series, of means which are interposed between either series and the disk in order to render said series inactive.

6. In an electric motor, the combination with a dielectric disk, and a plurality of needle-dischargers arranged at the periphery of the same and divided into groups the dischargers of which are directed oppositely, of a regulating plate by which either group may be rendered inactive.

7. In an electrostatic motor, a shiftable regulating plate having a plurality of parallel ribs.

8. In an electrostatic motor, a regulating plate having parallel ribs, and insulating strips set in between said ribs.

In testimony, that I claim the foregoing as my invention, I have signed my name in presence of two subscribing witnesses.

NIKOLAUS MYSCHKIN.

Witnesses:
  DIMITRY SWANOWSKI,
  CYRYL SIEDMICKI.